(12) United States Patent
Jian et al.

(10) Patent No.: US 11,365,286 B2
(45) Date of Patent: Jun. 21, 2022

(54) POLYARYLETHER-BASED POLYMER WITH SIDE CHAIN IN METHOXYPOLYETHYLENE GLYCOLS STRUCTURE, SOLID POLYMER ELECTROLYTE AND PREPARATION METHODS THEREFOR

(71) Applicant: DALIAN UNIVERSITY OF TECHNOLOGY, Liaoning (CN)

(72) Inventors: Xigao Jian, Liaoning (CN); Fangyuan Hu, Liaoning (CN); Cheng Liu, Liaoning (CN); Shouhai Zhang, Liaoning (CN); Jinyan Wang, Liaoning (CN); Lishuai Zong, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/370,713

(22) Filed: Jul. 8, 2021

(65) Prior Publication Data
US 2022/0017695 A1     Jan. 20, 2022

(30) Foreign Application Priority Data

Jul. 8, 2020   (CN) .......................... 202010653917.7
Aug. 17, 2020  (CN) .......................... 202010827585.X

(51) Int. Cl.
| | | |
|---|---|---|
| C08G 65/48 | (2006.01) | |
| C08G 65/40 | (2006.01) | |
| H01M 10/0565 | (2010.01) | |

(52) U.S. Cl.
CPC ....... *C08G 65/485* (2013.01); *C08G 65/4037* (2013.01); *H01M 10/0565* (2013.01); *C08G 2650/38* (2013.01); *H01M 2300/0082* (2013.01); *H01M 2300/0085* (2013.01)

(58) Field of Classification Search
CPC ........... H01M 10/0565; C08G 2650/38; C08G 2261/77; C08G 65/42; C08G 65/44; C08G 65/46; C08G 65/48; C08G 65/485; C08G 65/40
See application file for complete search history.

(56) References Cited

PUBLICATIONS

Hu, et al. "Novel poly(arylene ether ketone)/poly(ethylene glycol)—grafted poly(arylene ether ketone) composite microporous polymer electrolyte for electrical double-layer capacitors with efficient ionic transport", RSC Advances, 11, 14814-14823, Apr. 21, 2021. (Year: 2021).*

Na, Ruiqi et al., "A flexible solid-state supercapacitor based on a poly(aryl ether ketone)—poly(ethylene glycol) copolymer solid polymer electrolyte for high temperature applications," The Royal Society of Chemistry 2016, RSC Advances, vol. 6, 2016 pp. 65186-65195.

* cited by examiner

*Primary Examiner* — Christopher M Rodd
(74) *Attorney, Agent, or Firm* — Muncy, Geissler, Olds & Lowe, P.C.

(57) ABSTRACT

A polyarylether-based polymer with side chain in methoxypolyethylene glycols structure, a solid polymer electrolyte and preparation methods therefore are disclosed. The main chain of the polymer has a polymer structure containing a polyarylether group, the side chain has a methoxypolyethylene glycols structure, and the structural formula of the polyarylether-based polymer is as follows:

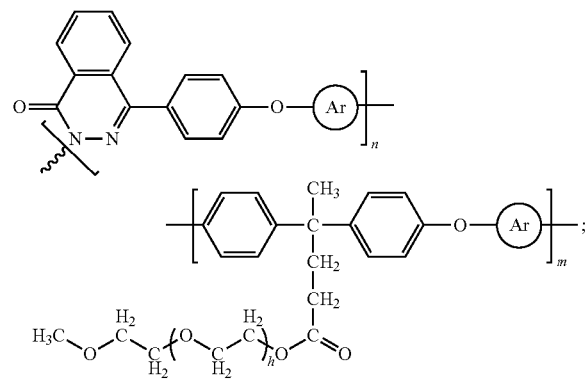

and the preparation method for the polyarylether-based polymer with side chain in methoxypolyethylene glycols structure comprises: step (1): preparing a polymer containing a polyarylether group; and step (2): dissolving the polymer containing a polyarylether group and methoxypolyethylene glycols in a solvent, then adding a catalyst, dripping a co-catalyst after the catalyst is dissolved, and conducting reaction while stirring to obtain the polyarylether-based polymer with side chain in methoxypolyethylene glycols structure. The all-solid polymer electrolyte prepared by the present invention has favorable ionic conductivity and excellent heat resistance, high temperature resistance and mechanical strength.

23 Claims, 4 Drawing Sheets

POLYARYLETHER-BASED POLYMER WITH SIDE CHAIN IN METHOXYPOLYETHYLENE GLYCOLS STRUCTURE, SOLID POLYMER ELECTROLYTE AND PREPARATION METHODS THEREFOR

TECHNICAL FIELD

The present invention relates to the technical field of polymer electrolyte preparation, and particularly relates to a polyarylether-based solid polymer electrolyte with high mechanical strength and heat resistance and a preparation method

BACKGROUND

With the increasing environmental pollution and energy crisis in the world, the development of clean energy technologies has received extensive attention and has promoted the development of electrochemical energy storage devices. As an important part of electrochemical energy storage devices, the electrolyte plays an important role in the safety of energy storage devices.

At present, the electrolyte of energy storage devices is mainly a liquid electrolyte which has many problems, for example, liquid leakage problem in the process of assembly and use, and safety problem caused by combustion of electrolytes at high temperature or during abnormal use for the reason that the liquid electrolyte is mainly organic electrolyte. Meanwhile, the liquid electrolyte limits the application environment of energy storage devices, and cannot satisfy the application conditions in some special fields or extreme environments such as petroleum exploration and aerospace. The solid polymer electrolyte is superior to the liquid electrolyte in terms of safety. However, the polymer electrolyte reported at present cannot satisfy the use conditions simultaneously in terms of mechanical strength and temperature range, so the development of a novel polyarylether-based solid polymer electrolyte with high mechanical strength and heat resistance has attracted more and more attention.

SUMMARY

In view of the defects and deficiencies in the prior art, the first purpose of the present invention is to provide a polyarylether-based polymer with side chain in methoxypolyethylene glycols structure and a preparation method therefor.

The second purpose of the present invention is to provide a solid polymer electrolyte and a preparation method therefor.

To solve the technical problems, the present invention adopts the following technical solutions:

A polyarylether-based polymer with side chain in methoxypolyethylene glycols structure is provided, wherein the main chain of the polymer has polymer structure containing polyarylether group, the side chain has methoxypolyethylene glycols structure, and the structural formula of the polyarylether-based polymer is as follows:

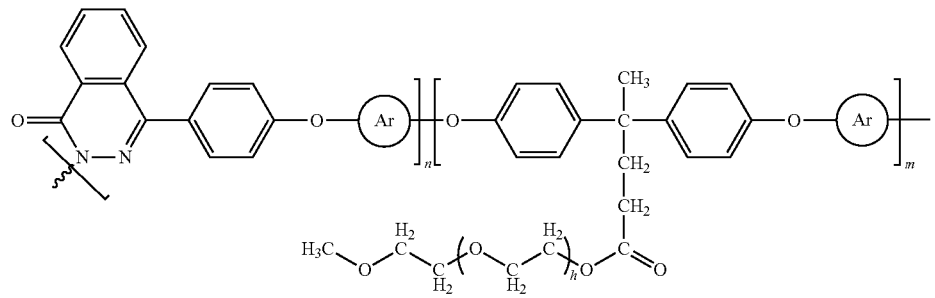

wherein Ar is at least one of

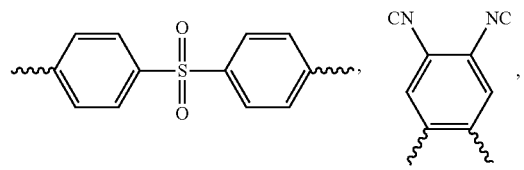

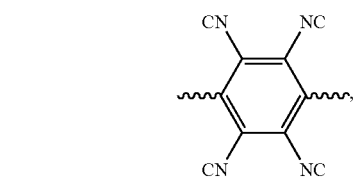

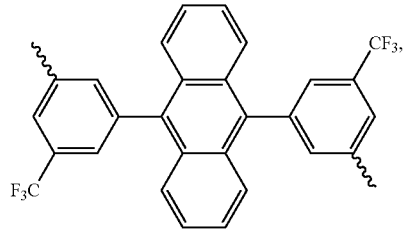

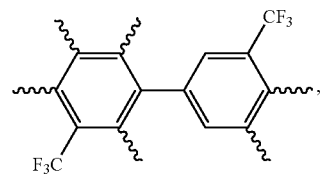

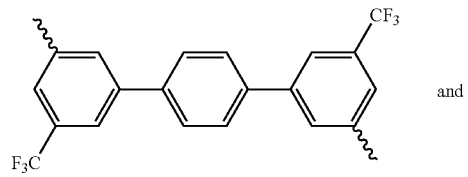

and

-continued

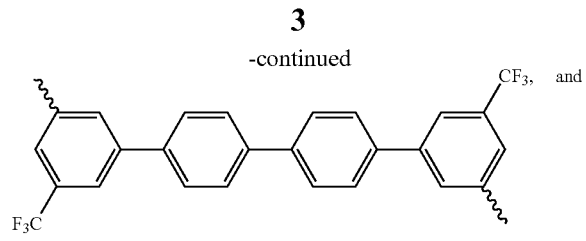

" $\sim\!\sim\!\sim$ " indicates connecting bond;

h is the number of repeat units of methoxypolyethylene glycols, n and m indicate the degree of polymerization, h is 4-400, $0<n/(m+n)<1$ and $0<m/(m+n)<1$;

The 5% thermal weight loss temperature of the polyarylether-based polymer is higher than 400° C., the glass transition temperature is 150-310° C., and the number-average molecular weight is 40000-70000.

A preparation method for the polyarylether-based polymer with side chain in methoxypolyethylene glycols structure, comprises:

Step (1): adding monomer

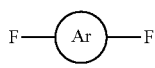

containing bis-fluorophenyl structure, diphenolic acid, phenol monomer containing phthalazinone structure, and salt-forming agent to reaction solvent, then adding water-carrying agent to obtain mixture, stirring the mixture, and heating for reflux after the solid matter is dissolved; removing the water-carrying agent, and heating for reaction to obtain a polymer solution; and pouring the polymer solution into water for precipitation to obtain polymer strip, and then washing and drying the polymer strip to obtain polymer containing polyarylether group;

Step (2): dissolving the polymer containing polyarylether group and methoxypolyethylene glycols in a solvent, then adding catalyst, dripping a co-catalyst after the catalyst is dissolved, and conducting reaction while stirring to obtain the polyarylether-based polymer with side chain in methoxypolyethylene glycols structure.

In the preparation method for the polyarylether-based polymer with side chain in methoxypolyethylene glycols structure, as a preferred embodiment, the preparation method also comprises step (3): washing and drying the polyarylether-based polymer with side chain in methoxypolyethylene glycols structure obtained in step (2); and preferably, drying is vacuum drying, the drying temperature is 80-90° C., and the drying time is 10-12 h.

In the preparation method for the polyarylether-based polymer with side chain in methoxypolyethylene glycols structure, as a preferred embodiment, in step (1), Ar in

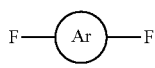

is at least one of

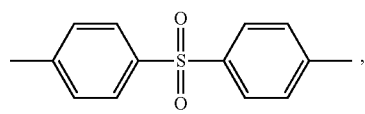

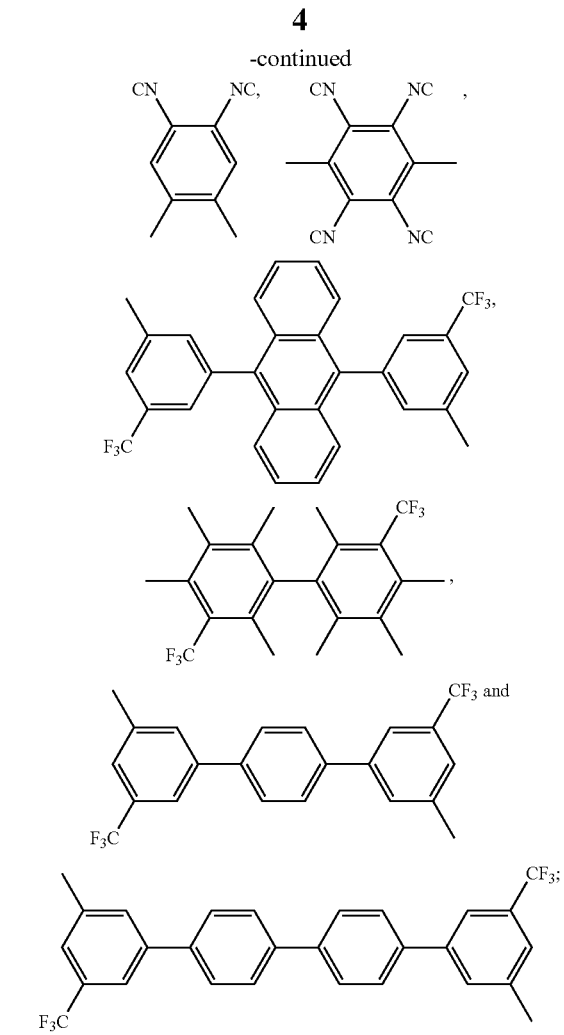

The structure of the diphenolic acid is

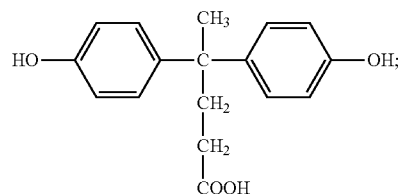 [SMILES: CC(CCC(=O)O)(c1ccc(O)cc1)c1ccc(O)cc1]

The structure of the phenol monomer containing phthalazinone structure is

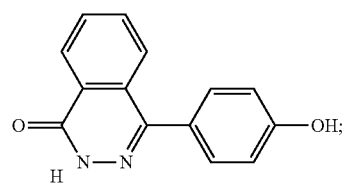

In the preparation method for the polyarylether-based polymer with side chain in methoxypolyethylene glycols structure, as a preferred embodiment, in step (1),

is 4,4'-difluorodiphenyl sulfone; and preferably, the molar ratio of the phenol monomer containing phthalazinone structure to 4,4'-difluorodiphenyl sulfone to diphenolic acid is (1-9):10:(9-1), for example, 1:10:9, 2:10:8, 3:10:7, 4:10:6, 5:10:5, 6:10:4, 7:10:3, 8:10:2 and 9:10:1.

In the preparation method for the polyarylether-based polymer with side chain in methoxypolyethylene glycols structure, as a preferred embodiment, in step (1), the salt-forming agent is potassium carbonate and/or sodium carbonate.

In the preparation method for the polyarylether-based polymer with side chain in methoxypolyethylene glycols structure, as a preferred embodiment, in step (1), the reaction solvent is at least one of sulfolane, N-methyl pyrrolidone, dimethyl acetamide and N,N-dimethylformamide.

In the preparation method for the polyarylether-based polymer with side chain in methoxypolyethylene glycols structure, as a preferred embodiment, in step (1), the mass content range of the solid matter in the mixture is 20%-60%.

In the preparation method for the polyarylether-based polymer with side chain in methoxypolyethylene glycols structure, as a preferred embodiment, in step (1), the water-carrying agent is toluene; and preferably, the addition amount of the water-carrying agent is ¼-½ of the volume of the reaction solvent.

In the preparation method for the polyarylether-based polymer with side chain in methoxypolyethylene glycols structure, as a preferred embodiment, in step (1), the reflux temperature is 120° C.-150° C., the reflux time is 1-4 h, potassium carbonate reacts with the phenol monomer containing phthalazinone structure and the diphenolic acid to generate water in the reflux process, and the water generated in the reaction can be removed through reflux. In the preparation method for the polyarylether-based polymer with side chain in methoxypolyethylene glycols structure, as a preferred embodiment, in step (1), the reaction temperature is 160° C.-190° C., and the reaction time is 6-9 h.

In the preparation method for the polyarylether-based polymer with side chain in methoxypolyethylene glycols structure, as a preferred embodiment, in step (1), washing is washing with ionized water for 3-10 times.

In the preparation method for the polyarylether-based polymer with side chain in methoxypolyethylene glycols structure, as a preferred embodiment, in step (2), the number-average molecular weight of the methoxypolyethylene glycols is 600-8000; and preferably, the number-average molecular weight of the methoxypolyethylene glycols is at least one of 600, 800, 1000, 2000, 5000, 6000 and 8000.

In the preparation method for the polyarylether-based polymer with side chain in methoxypolyethylene glycols structure, as a preferred embodiment, in step (2), one hydroxyl terminal of the methoxypolyethylene glycols is capped with alkyl group, and the other one is free hydroxyl terminal;

More preferably, the structure of the methoxypolyethylene glycols is

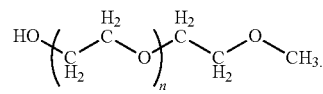

In the preparation method for the polyarylether-based polymer with side chain in methoxypolyethylene glycols structure, as a preferred embodiment, in step (2), the solvent is at least one of N-methyl pyrrolidone, dimethyl acetamide, N,N-dimethylformamide and tetrahydrofuran.

In the preparation method for the polyarylether-based polymer with side chain in methoxypolyethylene glycols structure, as a preferred embodiment, in step (2), the catalyst is DMAP, and preferably, the molar ratio of the DMAP to the carboxyl group in the polymer containing polyarylether group is 0.1-0.5.

In the preparation method for the polyarylether-based polymer with side chain in methoxypolyethylene glycols structure, as a preferred embodiment, in step (2), the co-catalyst is EDC, and preferably, the molar ratio of the EDC to the carboxyl group in the polymer containing polyarylether group is 0.5-2.5.

In the preparation method for the polyarylether-based polymer with side chain in methoxypolyethylene glycols structure, as a preferred embodiment, in step (2), the reaction time is 24-96 h. If the reaction time is too short, the polymerization reaction is incomplete, small molecules such as monomer have more impurities, and the yield is low; and if the time is too long, a cross-linking phenomenon will occur, which results in polymerization failure.

The synthesis reaction formula of the polyarylether-based polymer with side chain in methoxypolyethylene glycols structure is as follows:

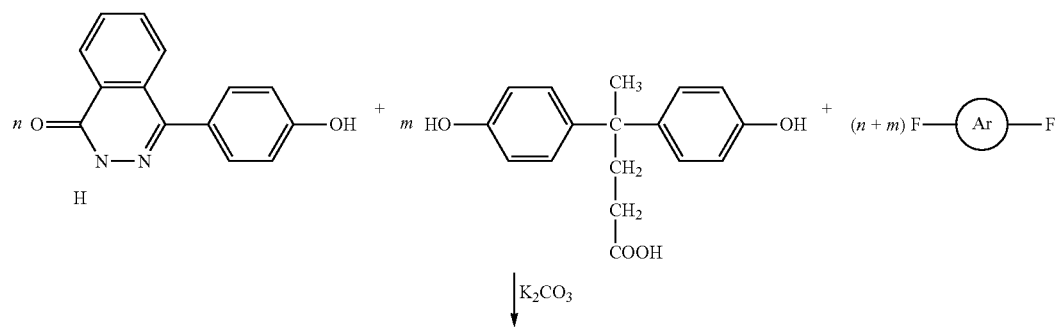

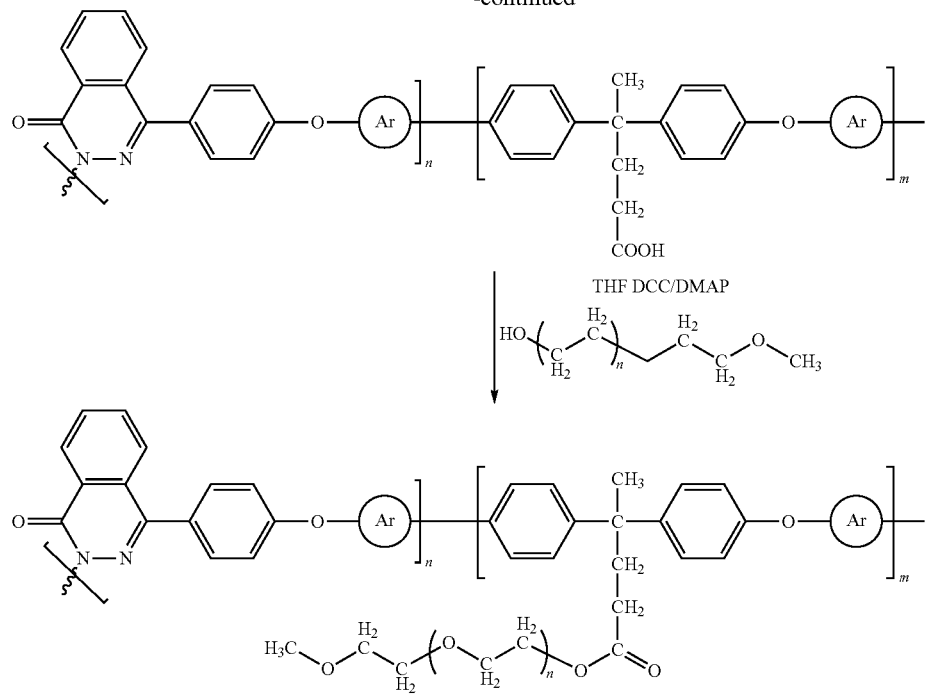

THF DCC/DMAP wherein Ar is at least one of

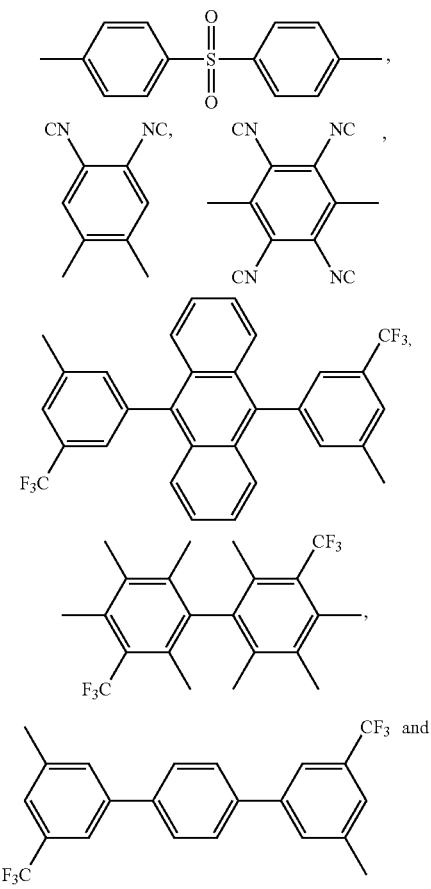

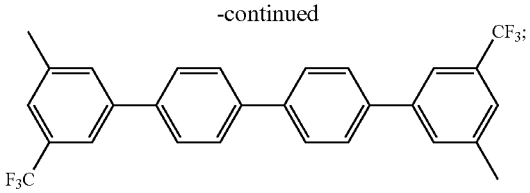

the fluorine-containing monomer selected by the present invention can be successfully synthesized with the remaining monomers to generate a polymer, and the selected monomer has rigid rings which can provide certain mechanical performance; and the grafted polymers obtained after polymerization and grafting of the fluorine-containing monomers of the present invention have the function of conducting ions, and can be used as solid electrolyte membranes, so the monomers listed above are selected.

A solid polymer electrolyte is prepared from the polyarylether-based polymer with side chain in methoxypolyethylene glycols structure.

A preparation method for a solid polymer electrolyte, comprises:

Preparing the polyarylether-based polymer with side chain in methoxypolyethylene glycols structure into microporous membrane by immersion phase inversion or solvent evaporation, and then immersing lithium salt solution into holes of the microporous membrane to prepare the solid polymer electrolyte.

Compared with the prior art, the present invention has the following positive effects:

(1) The present invention is a solid polymer electrolyte which is prepared from a monomer having a main chain in polyarylether structure and containing phthalazinone structure, a monomer containing an ether structure, a polymer with side chain in methoxypolyethylene glycols structure, and added lithium salt. The introduction of methoxypolyethylene glycols as the side chain provides guarantee for transmission of lithium ions in the polymer electrolyte, and the polyarylether group as the main chain structure provides excellent heat resistance and mechanical performance for the polymer electrolyte.

The preparation method for a solid polymer electrolyte of the present invention is simple and convenient, and the introduction of a rigid benzene ring structure into the main chain of the polymer and the introduction of a methoxypolyethylene glycols structure into the side chain effectively reduce the crystallinity of methoxypolyethylene glycols, enhance the conductivity of lithium salt, and improve the mechanical performance and thermal stability of the polymer; compared with the case where the methoxypolyethylene glycols structure is located in the main chain, the present invention places methoxypolyethylene glycols in the side chain, which can enhance the segmental motion capability of the side chain and increase the ionic conductivity; and meanwhile, the main chain is completely in a rigid structure, which can ensure the mechanical performance and thermal stability of the polymer.

(2) The all-state polymer electrolyte prepared in the present invention is simple in preparation and easy to control, and has favorable ionic conductivity and excellent heat resistance, high temperature resistance and mechanical strength. The present invention improves the defect of low conductivity of traditional polymer electrolytes at room temperature and ensures that electrochemical devices assembled by the all-solid polymer electrolyte such as lithium ion battery, solar cell and supercapacitor can safely and efficiently work at room temperature.

(3) The rigid ring structure of phthalazinone in this structure and sulfuryl in the monomer containing a bisfluorophenyl structure can improve the mechanical performance and the thermal stability, and phthalazinone has a non-coplanar structure, which can enhance the solubility of the polymer; and in addition, the flexible PEG structure of the side chain can improve the ionic conductivity of the solid electrolyte prepared from the polymer.

DETAILED DESCRIPTION

Figure 1:
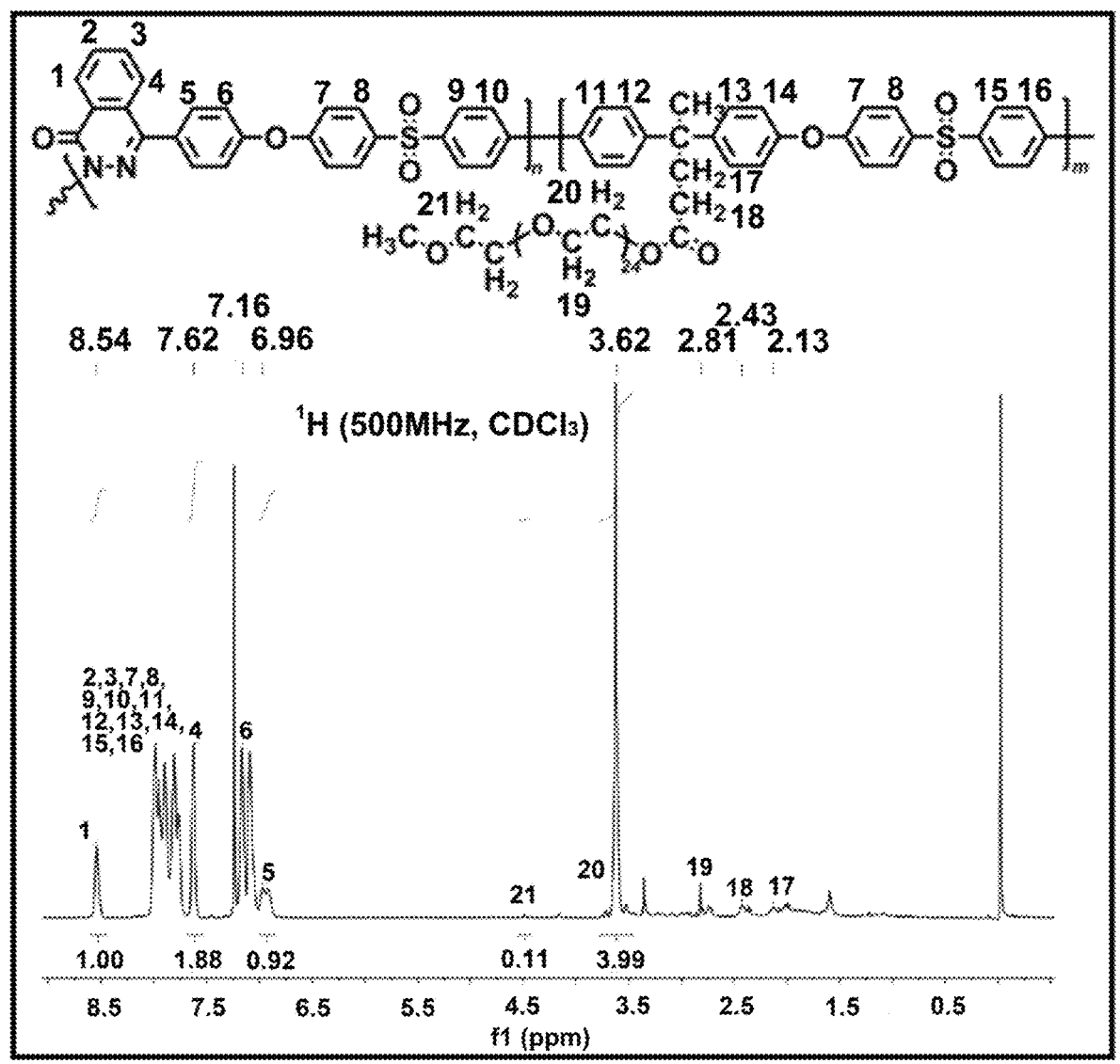
FIG. 1 is an NMR spectrogram of a polyarylether-based polymer with side chain in methoxypolyethylene glycols structure (poly (arylene ether) sulfone-methoxypolyethylene glycols polymer with side chain in methoxypolyethylene glycols (Mn=1000) structure) prepared in embodiment 1 of the present invention, illustrating the structure of the prepared poly (arylene ether) sulfone-methoxypolyethylene glycols polymer.

To highlight the purposes, the technical solution and the advantages of the present invention, the present invention will be further described below in combination with embodiments, and the examples are expressed by the explanation manner of the present invention rather than used for limiting the present invention. The technical solution of the present invention is not limited to the specific embodiments listed below, and also comprises any combination of the specific embodiments.

Embodiment 1 Preparation of Methoxypolyethylene Glycols-1000 Grafted Polyarylether-Based Polymer PAES7030-g-PEG 1) 0.07 mol of phenol monomer containing phthalazinone structure, 0.1 mol of 4,4'-difluorodiphenyl sulfone, 0.03 mol of diphenolic acid and 4 g of potassium carbonate are added to 100 mL of 98% sulfolane solvent. 50 mL of toluene as a water-carrying agent is added, the reactants are fully stirred and dissolved, and then heated to 130° C. for reflux for 4 h to ensure that water generated in the salt forming reaction is completely removed, then toluene is removed, and finally, the system is heated to 180° C. for reaction for 6 h to obtain a polymer solution.

2) The polymer solution prepared above is poured into deionized water for precipitation to obtain a flexible polymer strip, and the polymer strip is washed with deionized water for 3 times to remove the residual reaction solvent and small molecules not participating in the reaction; and the product obtained after suction filtration is placed in a vacuum oven for vacuum drying at 100° C. for 24 h to obtain a polymer with a main chain containing a polyarylether group, wherein the molar percentage of the carboxyl group is about 35%.

3) $7.2 \times 10^{-4}$ mol of prepared polymer with a main chain containing a polyarylether group and $4.5 \times 10^{-4}$ mol of methoxypolyethylene glycols-1000 are dissolved in tetrahydrofuran, added with 0.1 time of DMAP (i.e., the molar ratio of the DMAP to the carboxyl group in the polymer containing a polyarylether group is 0.1), dissolved completely at 20-60° C., dripped with 1 time of EDC (i.e., the molar ratio of the EDC to the carboxyl group in the polymer containing a polyarylether group is 1), and stirred at room temperature for 24-96 h to obtain a polyarylether-based polymer with side chain in methoxypolyethylene glycols structure.

4) The prepared polymer solution is immersed in deionized water and boiled for 3 times to remove unreacted small molecules and solvent, and then the polymer is dried to obtain a dry polyarylether-based polymer with side chain in methoxypolyethylene glycols structure.

The structural formula of the polymer is as follows:

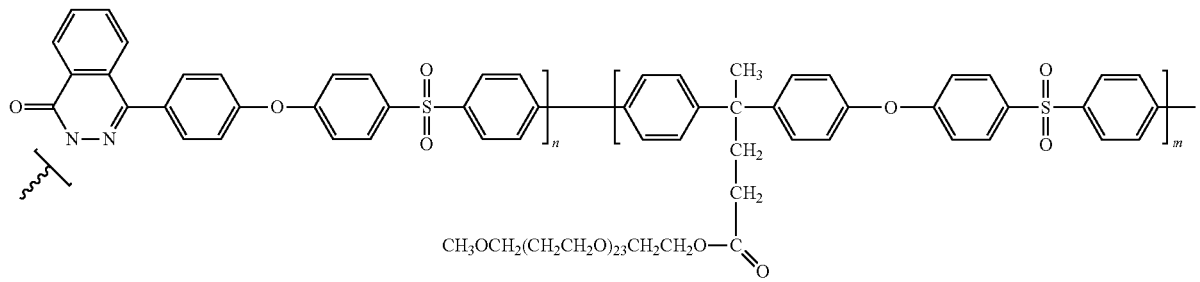

wherein the number-average molecular weight of the polymer is 54000.

Embodiment 2 Preparation of Methoxypolyethylene Glycols-1000 Grafted Polyarylether-Based Polymer PAES9010-g-PEG 1) 0.09 mol of phenol monomer containing phthalazinone structure, 0.1 mol of 4,4'-difluorodiphenyl sulfone, 0.01 mol of diphenolic acid and 4 g of potassium carbonate are added to 100 mL of 98% sulfolane solvent. 50 mL of toluene as a water-carrying agent is added, the reactants are fully stirred and dissolved, and then heated to 130° C. for reflux for 4 h to ensure that water generated in the salt forming reaction is completely removed, then toluene is removed, and finally, the system is heated to 180° C. for reaction for 6 h to obtain a polymer solution.

2) The polymer solution prepared above is poured into deionized water for precipitation to obtain a flexible polymer strip, and the polymer strip is washed with deionized water for 3 times to remove the residual reaction solvent and small molecules not participating in the reaction; and the product obtained after suction filtration is placed in a vacuum oven for vacuum drying at 100° C. for 24 h to obtain a polymer with a main chain containing a polyarylether group, wherein the molar percentage of the carboxyl group is about 35%.

3) $1.0 \times 10^{-3}$ mol of prepared polymer with a main chain containing a polyarylether group and $4.5 \times 10^{-4}$ mol of methoxypolyethylene glycols-1000 are dissolved in tetrahydrofuran, added with 0.1 time of DMAP (i.e., the molar ratio of the DMAP to the carboxyl group in the polymer containing a polyarylether group is 0.1), dissolved completely at 20-60° C., dripped with 1 time of EDC (i.e., the molar ratio of the EDC to the carboxyl group in the polymer containing a polyarylether group is 1), and stirred at room temperature for 24-96 h to obtain a polyarylether-based polymer with side chain in methoxypolyethylene glycols structure.

4) The prepared polymer solution is immersed in deionized water and boiled for 3 times to remove unreacted small molecules and solvent, and then the polymer is dried to obtain a dry polyarylether-based polymer with side chain in methoxypolyethylene glycols structure.

The structural formula of the polymer is as follows:

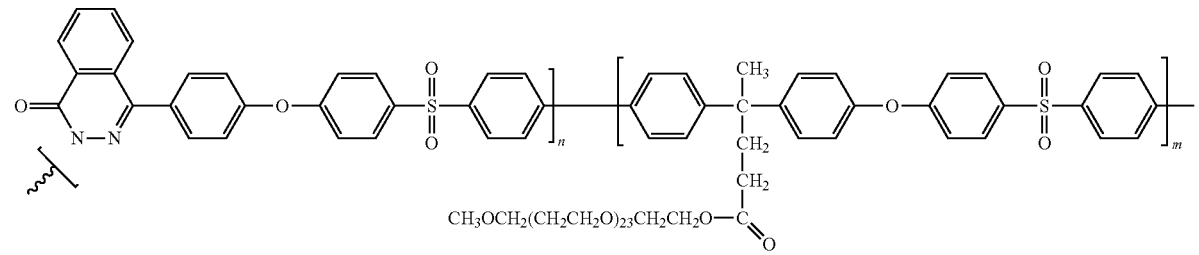

wherein the number-average molecular weight of the polymer is 65000.

FIG. 1 is an NMR spectrogram of a polyarylether-based polymer with side chain in methoxypolyethylene glycols structure prepared in embodiment 1, wherein the chemical shift of 7-7.25 ppm respectively corresponds to hydrogen in positions 5 and 6, 7.75-8 ppm respectively corresponds to hydrogen in positions 7, 8, 9 and 10, 2 ppm and 2.5 ppm respectively correspond to hydrogen in positions 17 and 18, and 2.75 ppm, 3.75 ppm and 4.5 ppm respectively correspond to hydrogen in positions 19, 20 and 21 in the methoxypolyethylene glycols segment; and FIG. 1 indicates that the polyarylether-based polymer containing a methoxypolyethylene glycols structure is successfully synthesized.

Figure 2:
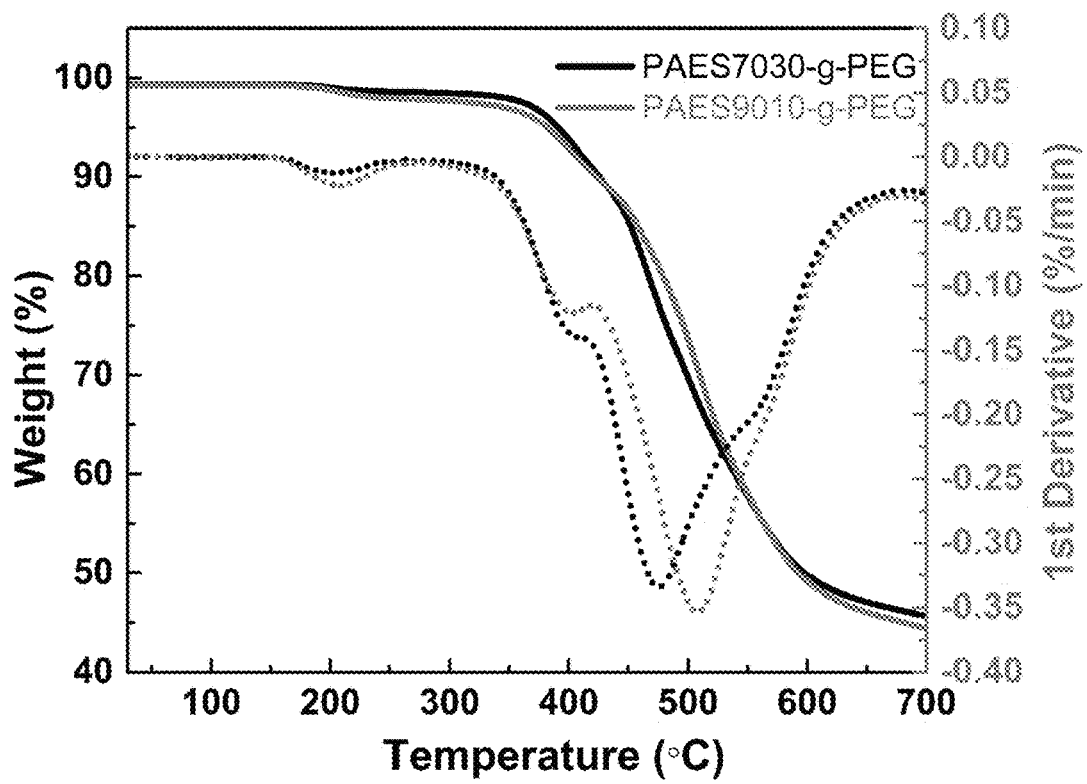
FIG. 2 shows TGA curves of polymers prepared in embodiment 1 and embodiment 2 of the present invention.

FIG. 2 shows TGA curves of polymers prepared in embodiment 1 and embodiment 2, illustrating that the 5% decomposition temperatures of the prepared polymers in embodiment 1 and embodiment 2 are respectively 382° C. and 392° C. and have excellent thermal stability.

Figure 3:
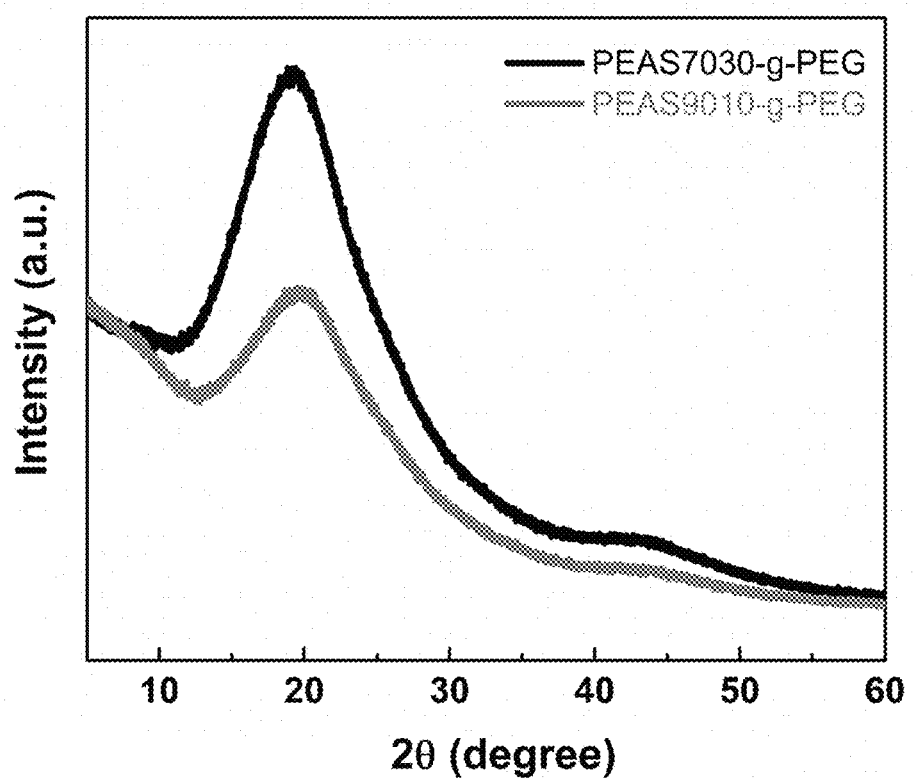
FIG. 3 shows DSC curves of polymers prepared in embodiment 1 and embodiment 2 of the present invention.

FIG. 3 shows DSC curves of polymers prepared in embodiment 1 and embodiment 2, illustrating that the glass transition temperature of the prepared polymers is 194° C.-230° C.

Figure 4:
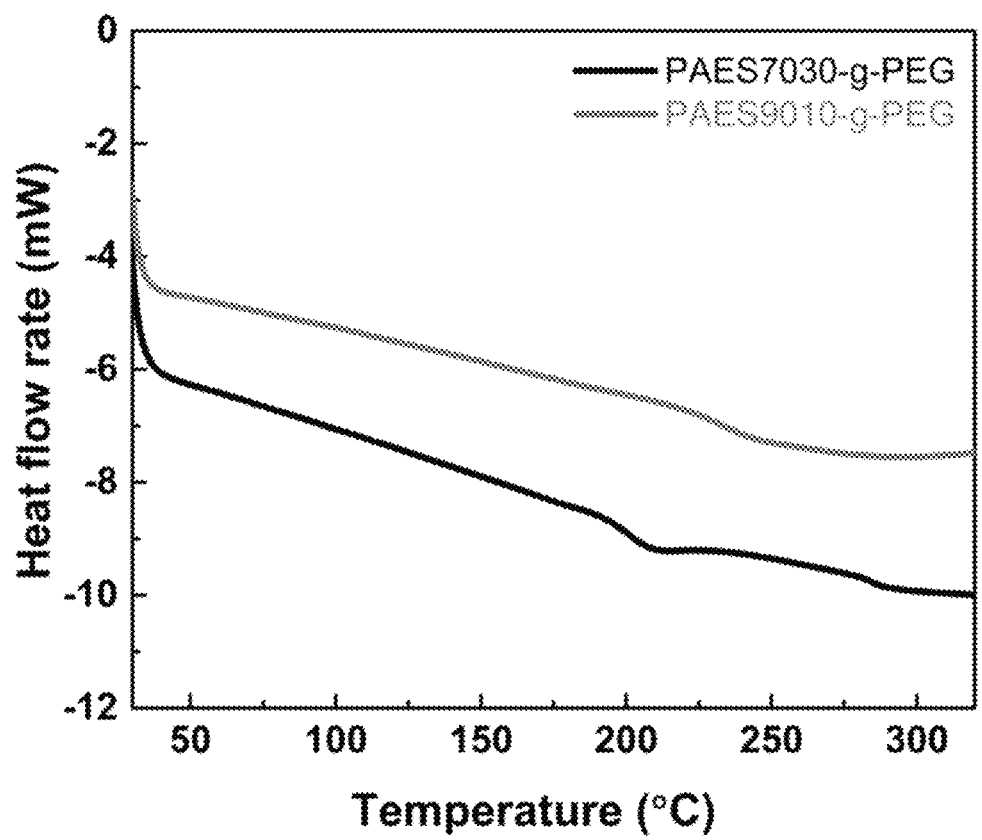
FIG. 4 shows XRD curves of polymers prepared in embodiment 1 and embodiment 2 of the present invention.

FIG. 4 shows XRD curves of polymers prepared in embodiment 1 and embodiment 2, illustrating that the prepared polymers present an amorphous state without crystallization behavior.

Compared with traditional polymers, for example, polyether-ether-ketone (PEEK) developed and researched by Imperial Chemical Industries Limited in 1982 can only be dissolved in concentrated sulfuric acid at room temperature, the polymer of the present invention can be dissolved in NMP, DMAc and chloroform and has favorable solubility.

Embodiment 3: Preparation of Solid Polymer Electrolytes 1 and 2 by Solvent Evaporation 1) 0.8 g of dry polyarylether-based polymers with side chain in methoxypolyethylene glycols structure prepared in embodiment 1 and embodiment 2 is dissolved in 8 mL of sulfolane solvent, and stirred at room temperature for 7 h to obtain a uniform and transparent mixed solution.

2) The solution prepared in step 1) is poured on a 8×8 cm horizontal glass plate to form a membrane, the membrane is dried in vacuum at 30-60° C. for 72 h to remove the solvent so as to obtain a solid polymer electrolyte membrane, and then the solid polymer electrolyte membrane is immersed into a 10 wt % lithium salt solution and taken out to respectively obtain all-solid polymer electrolytes 1 and 2, wherein the tensile strengths of the obtained solid polymer electrolyte membranes are 40 MPa and 35 MPa.

Embodiment 4: Preparation of Solid Polymer Electrolytes 3 and 4 by Immersion Phase Inversion 1) 0.8 g of polymers prepared in embodiment 1 and embodiment 2 is dissolved in 8 mL of sulfolane solvent, and stirred at room temperature for 7 h to obtain a uniform and transparent mixed solution.

2) The solution prepared in step 1) is poured on a 8×8 cm horizontal glass plate to form a membrane, the glass plate coated with the polymer solution is immersed into deionized water at 0-25° C. for 72 h to remove the solvent and dried in vacuum at 60-80° C. for 72 h to remove water so as to obtain a dry solid polymer electrolyte membrane, and then the solid polymer electrolyte membrane is immersed into a 10 wt % lithium salt solution to respectively obtain all-solid polymer electrolytes 3 and 4.

Figure 5:
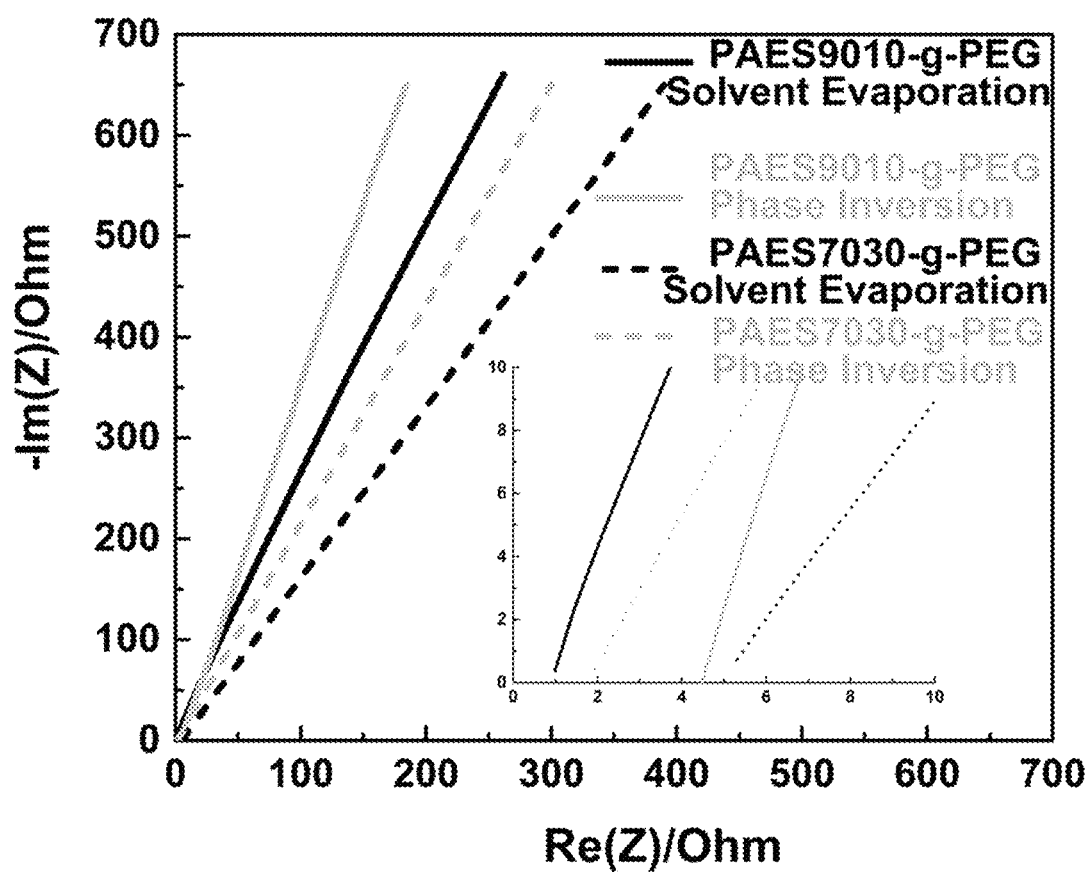
FIG. 5 shows ionic conductivities of solid electrolyte 1 and solid electrolyte 2 prepared in embodiment 1 of the preset invention and ionic conductivities of solid electrolyte 3 and solid electrolyte 4 prepared in embodiment 2 of the present invention at room temperature (the graph in the lower right corner of FIG. 5 is a partial enlarged view of abscissas 0-10).

FIG. 5 shows ionic conductivities of a solid electrolyte 1, a solid electrolyte 2, a solid electrolyte 3 and a solid electrolyte 4 prepared in embodiment 1 and embodiment 2 at room temperature, wherein it is obtained according to the electrochemical impedance spectroscopy test curve and the corresponding calculation formula that: the ionic conductivities of the solid electrolytes 1, 2, 3 and 4 at room temperature are respectively $2.5 \times 10^{-3}$ S cm$^{-1}$, $2.9 \times 10^{-3}$ S cm$^{-1}$, $4.0 \times 10^{-3}$ S cm$^{-1}$ and $4.4 \times 10^{-3}$ S cm$^{-1}$, indicating that the prepared solid electrolytes have favorable ionic conductivity; and the calculation formula of ionic conductivity σ is as follows:

$$\sigma = \frac{L}{R_b S}$$

wherein $R_b$ (ohm) is the body resistance of the electrolyte, L (cm) is the thickness of the electrolyte membrane, and S (cm$^2$) is the effective contact area of the electrolyte membrane and stainless steel.

The polymer prepared by the present invention is a graft polymer with side chain containing PEO, which is based on the conductivity of PEO. In addition, Wang et al. disclosed a polyether ketone-based polymer with PEO as a main chain [refer to: Ruiqi Na, PengfeiHuo, XingruiZhang, et al. A flexible solid-state supercapacitor based on a poly(aryl ether ketone)-poly(ethylene glycol) copolymer solid polymer electrolyte for high temperature applications[J]. RSC Adv., 2016, 6, 65186.], wherein the ionic conductivity of the obtained polymer electrolyte with PEO located in the main chain at 30° C. is $2.6 \times 10^{-4}$ S/cm, which is less than that of the electrolyte with PEO located in the main chain in this patent.

The invention claimed is:

1. A preparation method for the polyarylether-based polymer with side chain in methoxypolyethylene glycols structure, wherein main chain of the polymer has a polymer structure containing polyarylether group, side chain has a Methoxypolyethylene glycols structure, and the structural formula of the polyarylether-based polymer is as follows:

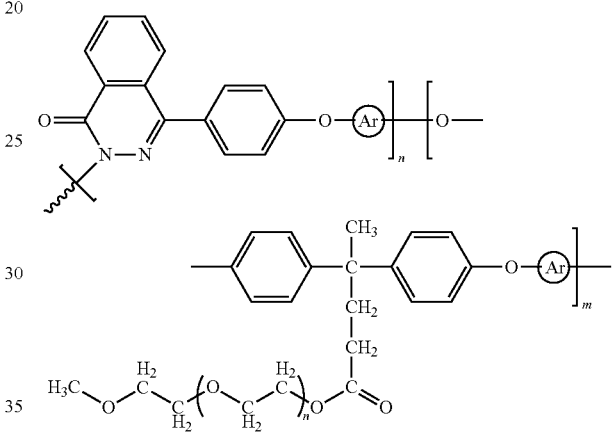

wherein Ar is at least one of

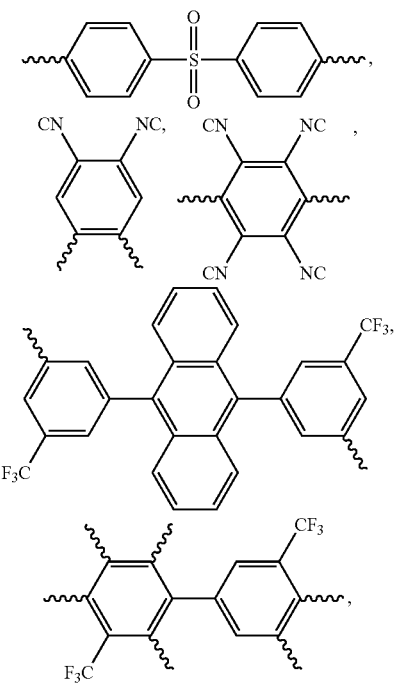

-continued

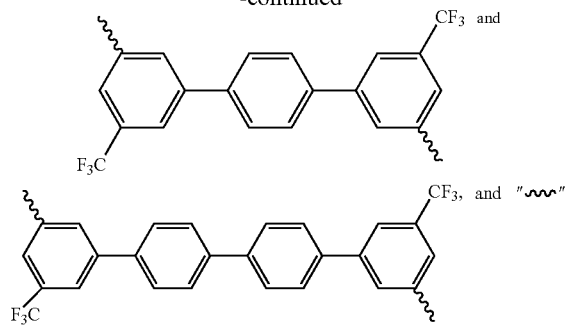

indicates a connecting bond;
h is the number of repeat units of methoxypolyethylene glycols, n and m indicate the degree of polymerization, h is 4-400, $0<n/(m+n)<1$ and $0<m/(m+n)<1$;
wherein, the 5% thermal weight loss temperature of the polyarylether-based polymer is higher than 400° C., the glass transition temperature is 150-310° C., and the number-average molecular weight is 40000-70000;
wherein the preparation method comprising:
step (1): adding monomer

containing bis-fluorophenyl structure, diphenolic acid, phenol monomer containing phthalazinone structure, and salt-forming agent to a reaction solvent, then adding water-carrying agent to obtain a mixture, stirring the mixture, and heating for reflux after the solid matter is dissolved; removing the water-carrying agent, and heating for reaction to obtain polymer solution; and pouring the polymer solution into water for precipitation to obtain polymer strip, and then washing and drying the polymer strip to obtain polymer containing polyarylether group;
step (2): dissolving the polymer containing polyarylether group and methoxypolyethylene glycols in a solvent, then adding catalyst, dripping a co-catalyst after the catalyst is dissolved, and conducting reaction while stirring to obtain the polyarylether-based polymer with side chain in methoxypolyethylene glycols structure.

2. The preparation method for the polyarylether-based polymer with side chain in methoxypolyethylene glycols structure according to claim 1, wherein the preparation method also comprises step (3): washing and drying the polyarylether-based polymer with side chain in methoxypolyethylene glycols structure obtained in step (2).

3. The preparation method for the polyarylether-based polymer with side chain in methoxypolyethylene glycols structure according to claim 2, wherein drying is vacuum drying, the drying temperature is 80-90° C., and the drying time is 10-12 h.

4. The preparation method for the polyarylether-based polymer with side chain in methoxypolyethylene glycols structure according to claim 1, wherein in step (1), Ar in

is at least one of

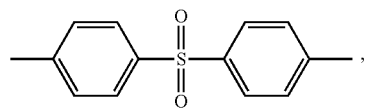

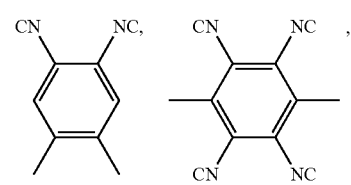

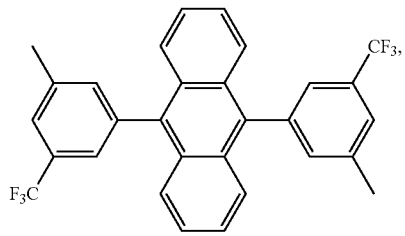

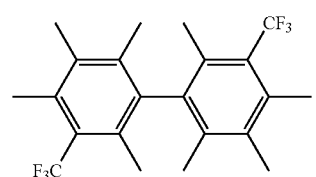

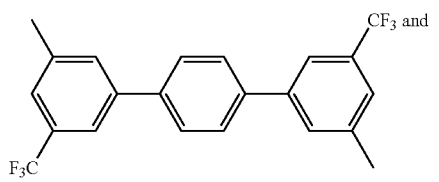

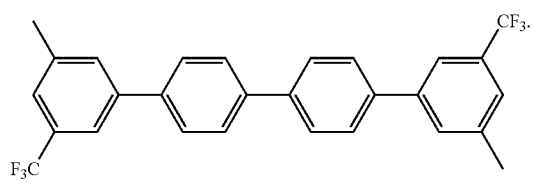

5. The preparation method for the polyarylether-based polymer with side chain in methoxypolyethylene glycols structure according to claim 1, wherein in step (1), the structure of the diphenolic acid is

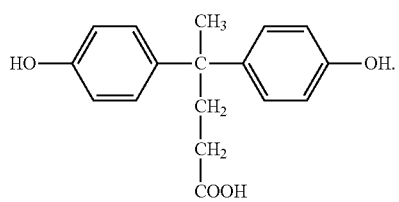 [SMILES: CC(CCC(=O)O)(c1ccc(O)cc1)c1ccc(O)cc1]

6. The preparation method for the polyarylether-based polymer with side chain in methoxypolyethylene glycols structure according to claim 1, wherein in step (1), the structure of the phenol monomer containing phthalazinone structure is

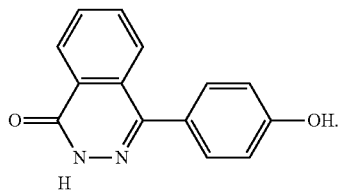

7. The preparation method for the polyarylether-based polymer with side chain in methoxypolyethylene glycols structure according to claim 4, wherein in step (1),

is 4,4'-difluorodiphenyl sulfone.

8. The preparation method for the polyarylether-based polymer with side chain in methoxypolyethylene glycols structure according to claim 7, wherein in step (1), the molar ration of the phenol monomer containing phthalazinone structure to 4,4'-difluorodiphenyl sulfone to diphenolic acid is (1-9):(10)":(9-1).

9. The preparation method for the polyarylether-based polymer with side chain in methoxypolyethylene glycols structure according to claim 1, wherein in step (1), the salt-forming agent is potassium carbonate and/or sodium carbonate.

10. The preparation method for the polyarylether-based polymer with side chain in methoxypolyethylene glycols structure according to claim 1, wherein in step (1), the reaction solvent is at least one of sulfolane, N-methyl pyrrolidone, dimethyl acetamide and N,N-dimethylformamide.

11. The preparation method for the polyarylether-based polymer with side chain in methoxypolyethylene glycols structure according to claim 1, wherein in step (1), the mass content range of the sold matter in the mixture is 26%-60%.

12. The preparation method for the polyarylether-based polymer with side chain in methoxypolyethylene glycols structure according to claim 1, wherein in step (1), the water-carrying agent is toluene.

13. A preparation method for a solid polymer electrolyte, comprising: preparing a microporous membrane of a polyarylether based polymer with side chain in methoxypolyethylene glycols structure by immersion phase inversion or solvent evaporation, wherein main chain of the polymer has a polymer structure containing polyarylether group, side chain has a methoxypolyethylene glycols structure, and the structural formula of the polyarylether-based polymer is as follows:

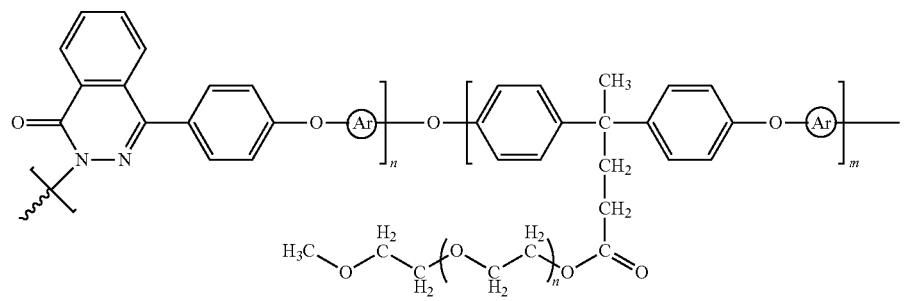

wherein Ar is at least one of

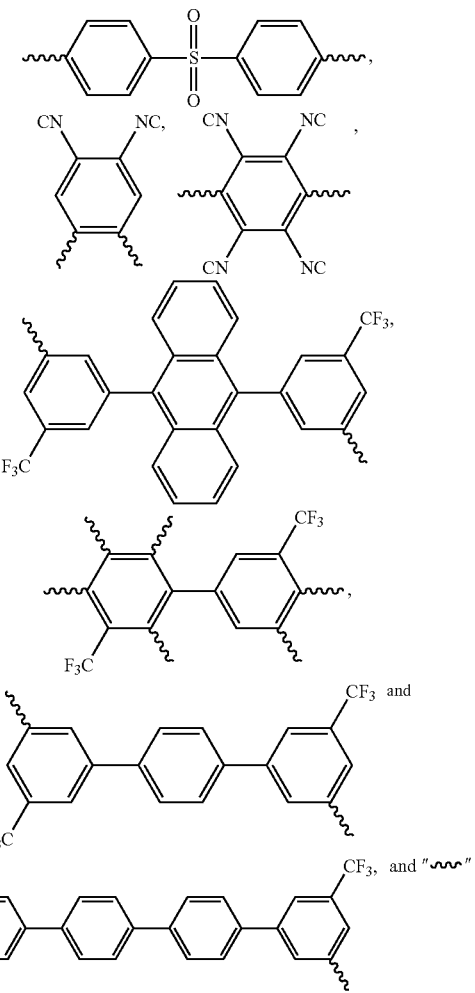

indicates a connecting bond;

h is the number of repeat units of methoxypolyethylene glycols, n and m indicate the degree of polymerization, h is 4-400, 0<n/(m+n)<1 and 0<m/(m+n)<1;

wherein, the 5% thermal weight loss temperature of the polyarylether-based polymer is higher than 400° C., the glass transition temperature is 150-310° C., and the number-average molecular weight is 40000-70000, into a microporous membrane by immersion phase inversion or solvent evaporation, and then immersing lithium salt solution into holes of the microporous membrane to prepare the solid polymer electrolyte.

14. The preparation method for the polyarylether-based polymer with side chain in methoxypolyethylene glycols structure according to claim 1, wherein in step (1), the reflux temperature is 120° C.-150° C., and the reflux time is 1-4 h.

15. The preparation method for the polyarylether-based polymer with side chain in methoxypolyethylene glycols structure according to claim 1, wherein in step (1), the reaction temperature is 160° C.-190° C., and the reaction time is 6-9 h.

16. The preparation method for the polyarylether-based polymer with side chain in methoxypolyethylene glycols structure according to claim 1, wherein in step (2), the number-average molecular weight of the methoxypolyethylene glycols is 600-8000.

17. The preparation method for the polyarylether-based polymer with side chain in methoxypolyethylene glycols structure according to claim 16, wherein in step (2), the number-average molecular weight of the methoxypolyethylene glycols is at least one of 600, 800, 1000, 2000, 5000, 6000 and 8000.

18. The preparation method for the polyarylether-based polymer with side chain in methoxypolyethylene glycols structure according to claim 1, wherein in step (2), the solvent is at least one of N-methyl pyrrolidone, dimethyl acetamide, N,N-dimethylformamide and tetrahydrofuran.

19. The preparation method for the polyarylether-based polymer with side chain in methoxypolyethylene glycols structure according to claim 1, wherein in step (2), the catalyst is DMAP.

20. The preparation method for the polyarylether-based polymer with side chain in methoxypolyethylene glycols structure according to claim 19, wherein in step (2), the molar ratio of the DMAP to the carboxyl group in the polymer containing polyarylether group is 0.1-0.5.

21. The preparation method for the polyarylether-based polymer with side chain in methoxypolyethylene glycols structure according to claim 1, wherein in step (2), the co-catalyst is EDC (1-(3-Dimethylaminopropyl)-3-ethylcarbodiimide hydrochloride).

22. The preparation method for the polyarylether-based polymer with side chain in methoxypolyethylene glycols structure according to claim 21, wherein in step (2), the molar ratio of the EDC to the carboxyl group in the polymer containing polyarylether group is 0.5-2.5.

23. The preparation method for the polyarylether-based polymer with side chain in methoxypolyethylene glycols structure according to claim 1, wherein in step (2), the reaction time is 24-96 h.

* * * * *